(12) United States Patent
Warren et al.

(10) Patent No.: US 6,410,165 B1
(45) Date of Patent: Jun. 25, 2002

(54) CRACK RESISTANT WELD

(75) Inventors: John Warren, Waukesha; Paul Neitzke, Menomonee Falls; Craig Higgins, Milwaukee, all of WI (US)

(73) Assignee: General Electric Company, Schenectady, NY (US)

(*) Notice: Subject to any disclaimer, the term of this patent is extended or adjusted under 35 U.S.C. 154(b) by 35 days.

(21) Appl. No.: 09/723,940

(22) Filed: Nov. 28, 2000

Related U.S. Application Data (62) Division of application No. 09/352,393, filed on Jul. 13, 1999, now Pat. No. 6,335,512.

(51) Int. Cl.⁷ .......................... B23K 35/22; B23K 9/00; B32B 15/18
(52) U.S. Cl. .................... 428/680; 428/679; 228/262.3; 228/262.471; 228/262.71
(58) Field of Search ................................ 428/680, 679; 228/262.3, 262.41, 262.71

(56) References Cited

U.S. PATENT DOCUMENTS

| | | | |
|---|---|---|---|
| 4,187,442 A | * | 2/1980 | Hueschen et al. |
| 4,336,312 A | * | 6/1982 | Clark et al. |
| 4,569,070 A | * | 2/1986 | Schubert et al. |
| 4,969,172 A | * | 11/1990 | Fengler et al. |
| 5,628,449 A | * | 5/1997 | Onuma et al. |
| 6,157,702 A | * | 12/2000 | Reznikov et al. |

OTHER PUBLICATIONS

AMS Committee "F," "Aerospace Material Specification," Society of Automotive Engineers, Inc. p. 1–9, (Apr. 1992).
ASM Handbook, ASM International, vol. 6—Welding, Brazing, and Soldering, p. 717–718, (Dec. 1993).
Pinnow, K.E., et al, "P/M Tools Steels," ASM Handbook, ASM International, vol. 1, p. 780–783, (Mar. 1990).
Smith, D.F., et al, "A History of Controlled, Low Thermal Expansion Superalloys," The Minerals, Metals & Materials Society, p. 253–272, (1990) No Month.
"Watch Your Productivity Take Off . . . With CPM® REX® 20 Cobalt–Free Cutting Tools," Crucible Materials Corp. Data Sheet for CPM REX 20 (1994) No Month.

* cited by examiner

*Primary Examiner*—Deborah Jones
*Assistant Examiner*—Jason Savage
(74) *Attorney, Agent, or Firm*—Pat Winston Kennedy, Esq.; Kilpatrick Stockton LLP (57) ABSTRACT

A welding method that enables the joining of at least two dissimilar, metallic alloys to form a weld that is free of cracks is disclosed. The method incorporates a pure (99.00% minimum by weight) nickel fill-wire, integrally assembled into the joint between the two alloyed metals to be joined. The alloys joined by this method are an iron-based, low expansivity, gamma-prime strengthened superalloy (i.e., Incoloy®) and a high carbon, powder metallurgical tool steel high in refractory metal alloying agents (i.e., CPM REX 20). Welding of the joint results in the formation of a nickel rich region within the weld, thus "inoculating" the weld against cracks. The weld joint formed by the method of the present invention can be used in the fabrication of a rotating anode bearing shaft assembly for use in an x-ray generating device.

36 Claims, 4 Drawing Sheets

CRACK RESISTANT WELD

CROSS-REFERENCE TO RELATED APPLICATIONS

The present invention is a division of U.S. patent application Ser. No. 09/352,393, filed Jul. 13, 1999, now U.S. Pat. No. 6,335,512.

BACKGROUND OF THE INVENTION

The present invention relates to a method for producing a crack resistant weld and the fabrication of x-ray devices comprising same. More specifically, the present invention relates to a welding method for joining dissimilar, metallic alloys as well as a fortification metal to produce a weld that is free of cracks.

In an x-ray tube device with a rotating anode, the target consists of a disk composed of a low expansivity refractory metal, for example, a molybdenum based alloy. The x-rays are generated by focusing a narrow beam of high energy electrons onto the target while the target is rotated at high speeds. The target rotates on a center shaft assembly supported by ball bearings. The bearing shaft is typically fabricated from a high hardness tool steel that is able to retain high hardness when exposed to elevated temperatures over extended times. Due to the extremely high temperatures associated with an operating target, the tool steel bearing shaft cannot be attached directly to the target. The connection is established by way of a low thermal expansivity iron-based superalloy mounting hub that joins the target to the tool steel bearing shaft. The superalloy retains high strength when exposed to the high temperatures associated with the joint. The low expansion coefficient of the superalloy material matches closely with the expansivity of the refractory metal target, thus minimizing the contact stresses generated by expansivity mismatch. The integrity of the mechanical joint between the target and the mounting hub must be maintained throughout service, since plastic yielding at the mating surfaces between the two will ultimately result in rotational imbalance and possible premature tube failure.

The iron-based superalloy hub and the tool steel bearing shaft, when joined together, comprise the shaft assembly. Joining these dissimilar materials by a conventional welding method such as Tungsten Inert Gas (TIG) welding significantly simplifies the design of the assembly. For example, welding eliminates the need for either bolted joints or intermediate weld flanges. This is especially important when the design space allocated to the shaft assembly is restricted, which is almost always the case for a rotating anode X-ray tube where efficient use of space is important. Welding, unlike furnace brazing, also preserves the hardened tempers of each of the two materials, and limits annealing to a small heat zone that is affected adjacent to the weld centerline.

Attempts to TIG weld highly alloyed iron-based, low expansivity, gamma-prime strengthened superalloys to high carbon content (>1.0% by wt.) powder metallurgical, cobalt free, tool steels results in center-line weld cracks even when pre- and post welding heat-treatments are employed in the welding procedure. Thus, there remains a need to develop a welding technique that enables the joining of dissimilar, highly alloyed metals to form a stable weld joint without cracks at high temperatures.

SUMMARY OF THE INVENTION

The present invention is directed to a welding method that enables the joining of at least two dissimilar, metallic alloys without the formation of cracks. More specifically, the present invention is directed to a welding method that allows the joining of a highly alloyed iron-based, low expansivity, gamma-prime strengthened superalloy (for example, Pyromet Alloy CTX-909, Incoloy Alloy 903, Alloy 907 and Alloy 909) to a high carbon, powder metallurgical, cobalt free tool steel (i.e., CPM REX 20) that is high in refractory metal alloying agents. Cobalt free tool steels with chemical compositions similar to CPM REX 20, that contain a high weight % of carbon (>1%) and total refractory metal additions greater than 15 wt. %, are likely candidates for use in the present invention.

By incorporating commercially pure nickel (99.00% minimum by wt.) of sufficient quantity between the two alloyed metals to be joined and incorporating the nickel into the weld, a weld free of both centerline and tail cracks is obtained. The weld geometry is also designed to expose a portion of the nickel wire surface to the weld flame and, thus, enhance the mixing kinetics and resultant alloying of the nickel into the weld. The nickel inoculant can be introduced either as a formed wire or pre-formed washer. Although the details of the present invention focus on the use of a nickel wire, it is not intended that the present invention be limited as such. Further, the addition of nickel enables the weld to be constructed using standard TIG welding methods.

The benefits that are achieved with the welding technique of the present invention are best illustrated in the fabrication of a rotating anode bearing shaft assembly of the type that is used in an x-ray tube device and disclosed herein below. The bearing shaft assembly comprises an iron-based superalloy hub and a tool steel bearing shaft. The integrity of the joint that connects the superalloy hub and the tool steel bearing shaft must be maintained throughout the operation of the x-ray tube, otherwise rotational imbalance and premature tube failure will likely occur. The superior weld joint that is achieved with the method of the present invention overcomes the disadvantages observed with existing joints such as weld centerline cracks. By providing a weld joint of the type used in the present invention to join together dissimilar, highly alloyed metals under high temperature and stress conditions, articles of manufacture are produced having improved and unique thermo-mechanical properties. For example, the rotating anode bearing shaft assembly of the present invention exhibits superior properties, which include:

1. ease of assembly;
2. a tool steel bearing shaft free of the cost considerations associated with cobalt;
3. the retention of the full-hardness, high strength temper in both, the bearing shaft and the hub;
4. a high strength hub that possesses a low coefficient of thermal expansion (CTE); and
5. economy of design space by avoiding intermittent weld flanges.

The method of the present invention provides a welding method, the placement of a nickel fill wire in the joint to be welded as well as the chemical characteristics of the weld both with and without the nickel fill wire. Accordingly, it is an objective of the present invention to provide a bearing shaft assembly possessing unique thermo-mechanical properties. It is a further objective of the present invention to eliminate the need to have intermediate welding flanges or couplings that would otherwise be necessary, thereby minimizing the allocated design space for the bearing shaft assembly within the X-ray tube.

DETAILED DESCRIPTION OF THE INVENTION

The welding method of the present invention enables the joining of at least two dissimilar, highly alloyed metals to form a weld, which is crack resistant and ductile. A highly alloyed iron-based, low expansivity, gamma-prime strengthened superalloy (i.e., Pyromet Alloy CTX-909 manufactured by Carpenter Technology Corp., Reading Pa., Incoloy Alloy 903, Alloy 907 and Alloy 909 (Inco Alloys International, Huntington, W. Va.)) is joined to a high carbon, powder metallurgical, cobalt free tool steel (i.e., CPM REX 20 manufactured by Crucible Materials Corp., Pittsburgh, Pa.) that is high in refractory metal alloying agents. The present invention further relates to rotating anode X-ray tubes, which employ a rotating anode assembly and a cathode assembly encapsulated in a vacuum envelope made of either glass or metal.

Figure 1:
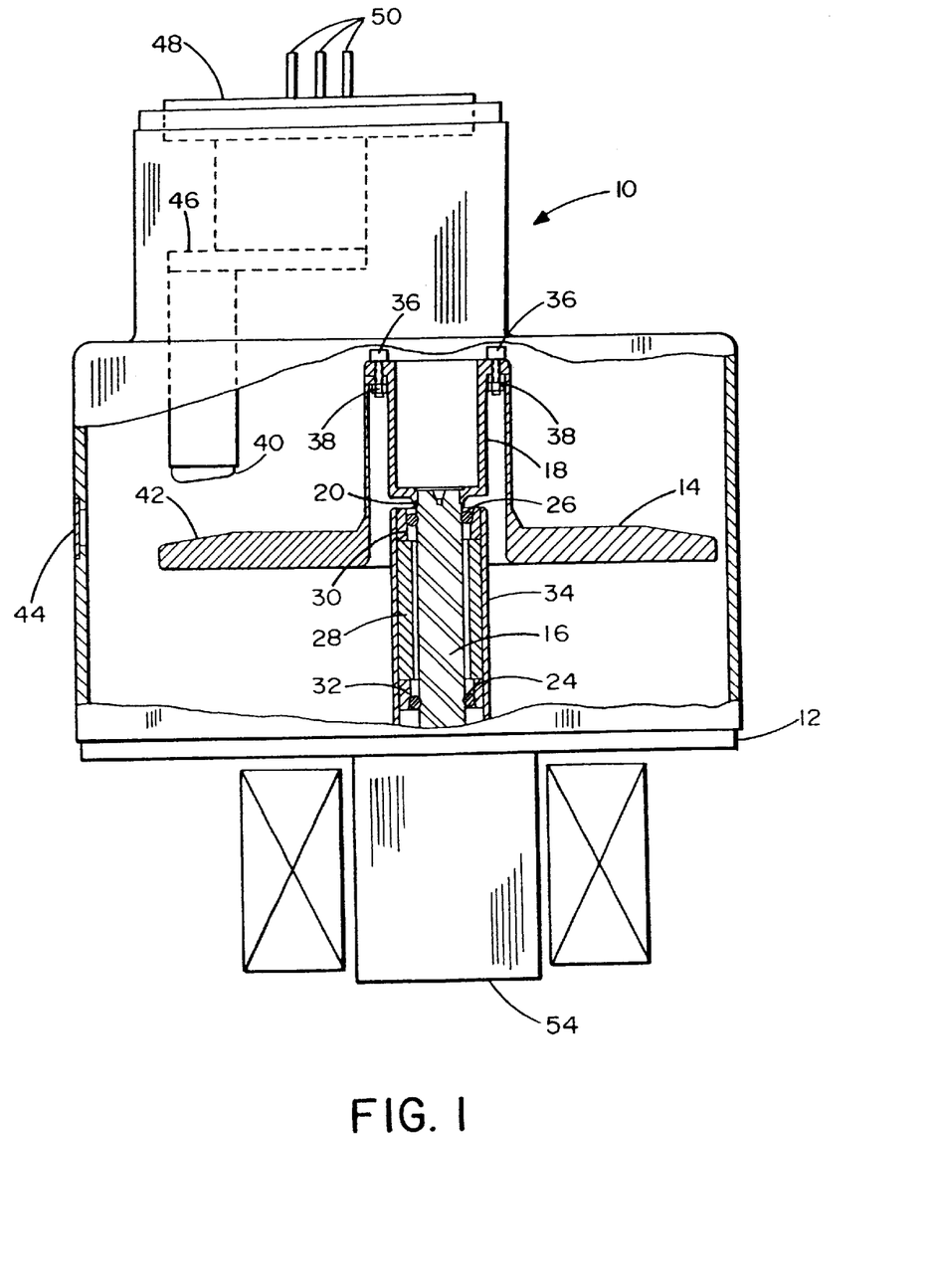
FIG. 1 is a sectional perspective of a rotating anode x-ray tube device including the bearing shaft assembly of the present invention.

Referring to FIG. 1, a typical rotating anode x-ray tube device 10, including the bearing shaft assembly of interest, is shown. The entire assembly is encapsulated in a high vacuum maintained by a vacuum envelope 12 fabricated from either metallic (i.e. stainless steel, copper) or oxide (i.e. glass, ceramic) materials. The rotating parts of the rotating anode assembly comprise a refractory metal target 14, fabricated from a molybdenum based alloy, a bearing shaft 16 which is typically fabricated from hardened tool steel, and a hub 18 typically fabricated from a low expansivity superalloy. When joined together by a weld-joint 20, the bearing shaft 16 and hub 18 comprise the bearing shaft assembly 22 (see FIG. 2). The bearing shaft 16 has precision raceways machined into its outer diameter (not shown in FIG. 2) to accommodate the rear bearing balls 24, and front bearing balls 26, which are axially spaced by a spacer 28, to facilitate rotation and support the anode assembly. A front outer-race 30, rear outer-race 32 and stationary bearing stem 34 complete the bearing assembly. The hub 18 is attached to target 14 by an appropriate number of target bolts 36 and nuts 38.

The rotating anode assembly is supported by the bearing stem 34 which is rigidly affixed at one end (not shown) to the base of the outer vacuum envelope 12. The rotating anode assembly is rotated by an induction motor assembly 54 located at, and attached to, the end of the bearing shaft 16. X-rays are generated from the target 14 by the collision of a high energy electron beam emitted from the cathode 40 focused onto an annular tungsten-rhenium alloy track 42, which is integrally bonded to the outer rim of the target 14. The electron beam is emitted from the cathode 40, which operates at a high negative electric potential relative to target 14. The negative potential across the cathode 40 and track 42 causes negatively charged electrons emitted by the cathode 40 to drift towards the track 42 and collide with it, resulting in x-ray generation. The cathode 40 to track 42 spacing is maintained by the structurally rigid, outer vacuum envelope 12. X-rays generated at the track 42 pass through an x-ray transparent window 44 located in the side wall of the vacuum envelope 12. The window material is typically fabricated from either beryllium, glass, titanium or aluminum, and is attached to form a hermetic seal by either brazing and/or welding processes. The cathode 40 is supported by a support arm 46, which is fastened to a high voltage insulator feed-through assembly 48. The power and high voltage that is necessary to both generate and repel electrons towards the track 42 are supplied to the cathode 40 by conductors 50.

Figure 2:
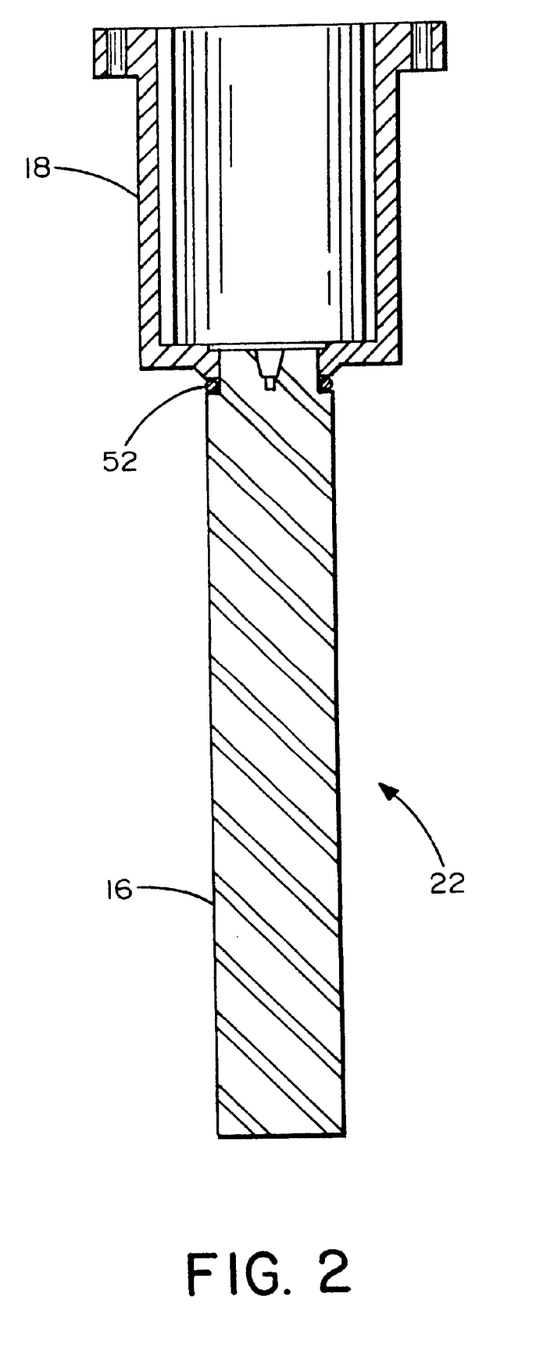
FIG. 2 is a sectional perspective view of the bearing shaft assembly having the weld joint fortified with nickel of the present invention.
Figure 3:
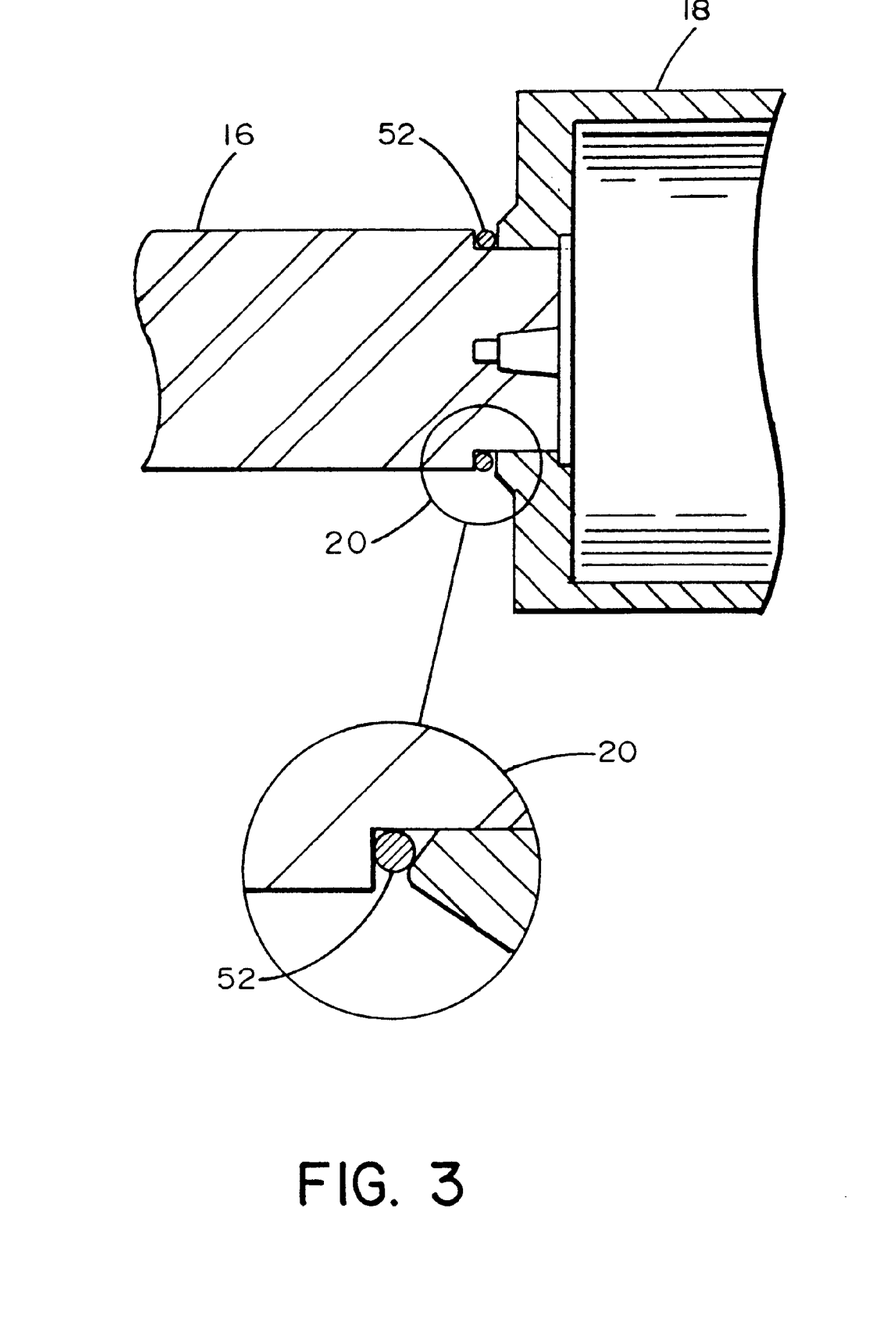
FIG. 3 is a sectional perspective view with the weld joint exploded to reveal the geometry of the weld joint and the fortification of the weld joint with the nickel of the present invention.

The bearing shaft assembly 22, which incorporates the nickel fill wire 52 of the present invention is illustrated in FIG. 2. The bearing shaft assembly 22 comprises the following components: bearing shaft 16, hub 18, and the nickel fill wire 52. In FIG. 3, an exploded view of weld joint 20 is shown, which is formed between hub 18 and bearing shaft 16. FIG. 3 further illustrates the positioning of the nickel fill wire 52 in the weld joint 20. Bearing shaft 16 is fabricated from powder metallurgically produced CPM REX 20 tool steel, which has the following (nominal) chemical composition by weight:

| | |
|---|---|
| Carbon | 1.30% |
| Manganese | 0.35% |
| Silicon | 0.25% |
| Chromium | 3.75% |
| Vanadium | 2.00% |
| Tungsten | 6.25% |
| Molybdenum | 10.50% |
| Sulfur | 0.03% |
| Iron | balance |

Iron comprises about 75% by weight of the alloy. The bearing shaft 16 material has a liquidus temperature of 1374° C. Although bearing shaft 16 was fabricated from CPM REX 20 tool steel, other alloy materials may be used for bearing shaft 16 including, but not limited to, ASP23, REX M2HCHS, REX M3HCHS, REX M4, REX M4HS, HAPIO, and KHA33N (all manufactured by Carpenter Technology Corp., Reading Pa.).

| REX 25 | |
|---|---|
| Carbon | 1.80% |
| Chromium | 4.00% |
| Tungsten | 12.50% |
| Molybdenum | 6.50% |
| Vanadium | 5.00% |
| REX M2HCHS | |
| Carbon | 1.00% |
| Chromium | 4.15% |
| Tungsten | 6.40% |
| Molybdenum | 5.00% |
| Vanadium | 2.00% |
| Sulphur | 0.25% |

-continued

| REX M3HCHS | |
|---|---|
| Carbon | 1.30% |
| Chromium | 4.00% |
| Tungsten | 6.25% |
| Molybdenum | 5.00% |
| Vanadium | 3.00% |
| Sulphur | 0.27% |
| REX M4 | |
| Carbon | 1.35% |
| Chromium | 4.25% |
| Tungsten | 5.75% |
| Molybdenum | 4.50% |
| Vanadium | 4.00% |
| Sulphur | 0.06% |
| REX M4HS | |
| Carbon | 1.35% |
| Chromium | 4.25% |
| Tungsten | 5.75% |
| Molybednum | 4.50% |
| Vanadium | 4.00% |
| Sulphur | 0.22% |
| HAP 10 | |
| Carbon | 1.35% |
| Chromium | 5.00% |
| Tungsten | 3.00% |
| Molybednum | 6.00% |
| Vanadium | 3.80% |
| ASP 23 | |
| Carbon | 1.28% |
| Chromium | 4.20% |
| Tungsten | 6.40% |
| Molybdenum | 5.00% |
| Vanadium | 3.10% |
| KHA 33N | |
| Carbon | 0.95% |
| Chromium | 4.00% |
| Tungsten | 6.00% |
| Molybednum | 6.00% |
| Vanadium | 3.50% |
| Other | 0.60% |

In carrying out the method of the present invention, hub 18 was fabricated from Pyromet Alloy CTX-909 superalloy, which has the following (nominal) chemical composition by weight:

| Carbon | 0.06% |
|---|---|
| Manganese | 0.50% |
| Silicon | 0.40% |
| Chromium | 0.50% |
| Cobalt | 14.00% |
| Titanium | 1.60% |
| Columbium + Tantalum | 4.90% |
| Aluminum | 0.15% |
| Copper | 0.50% |
| Boron | 0.012% |
| Sulfur | 0.03% |
| Nickel | 38.00% |
| Iron | balance |

Based on this data, iron comprises approximately 40% of the alloy by weight. The melting temperature range of CTX-909 is 1395–1432° C., which is approximately 21° C. higher than the liquidus of the CPM REX 20 bearing shaft 16 material. Although hub 18 is fabricated from Pyromet Alloy CTX-909 superalloy, other superalloy materials may be used for hub 18 including, but not limited to, Incoloy Alloy 903, 907, and 909 (all made by Inco Alloys International, Huntington, W. Va.).

The nominal chemical compositions by weight for the other superalloy materials are as follows:

| INCOLOY ALLOY 903 | |
|---|---|
| Carbon | 0.02% |
| Nickel | 38.00% |
| Iron | 41.00% |
| Cobalt | 15.00% |
| Titanium | 1.40% |
| Aluminum | 0.70% |
| Niobium | 3.00% |
| INCOLOY ALLOY 907 | |
| Nickel | 38.00% |
| Iron | 42.00% |
| Cobalt | 13.00% |
| Niobium | 4.70% |
| Titanium | 1.50% |
| Aluminum | 0.03% |
| Silicon | 0.15% |
| INCOLOY ALLOY 909 | |
| Nickel | 38.00% |
| Cobalt | 13.00% |
| Iron | 42.00% |
| Niobium | 4.70% |
| Titanium | 1.50% |
| Silicon | 0.40% |
| Aluminum | 0.03% |
| Carbon | 0.01% |

The nickel fill wire 52 is pure nickel wire (99.00% minimum by wt.) designated Electronic Grade "A" nickel, and has a liquidus temperature of 1440+/−5° C. While the nickel that was used for fortification of the weld was a formed wire, a preformed washer, is also suitable.

To compare welds made with and without the nickel fill wire 52, welds were fabricated and analyzed using identical weld settings. Each hub 18 and bearing shaft 16 were obtained from the same material lots. The recommended welding method is Gas-Tungsten Arc Welding (GTAW) also known as HeliArc welding, tungsten inert gas (TIG) or tungsten arc welding. Weld pool temperatures can approach 2500° C., and are aptly suited to melt the materials described in this process. The bearing shaft 16 is machined such that one end can be inserted into a machined hole in the hub 18 as is shown in FIG. 2. Prior to insertion of the bearing shaft 16 into the hub 18, the nickel fill wire 52, in the form of a ring, is placed over the bearing shaft 16 up against the shoulder of the bearing shaft 16 as depicted in FIG. 3. The bearing shaft 16 with nickel fill wire 52 are then press fit into the machined hole in the hub 18. Heating hub 18 prior to insertion and, thus, expanding its diameter will facilitate assembly. The hub 18 is machined such that the joint configuration shown in FIG. 3 traps the wire in the joint, and firmly locates its position throughout the entire weld process.

To make the circumferential weld necessary to produce the bearing shaft assembly 22, the pre-welded assembly shown in FIG. 2 is rotated about its axis with the welding torch brought up close against the joint. The torch tip is centered approximately on the centerline of the joint. It is then welded in a single pass to form the weld joint 20. After a weld is made around the entire joint, the weld is terminated by a power ramp down while the part continues to rotate. The approximate weld parameters are as follows:

| | |
|---|---|
| Weld joint diameter | 0.75 in. |
| Nickel fill wire diameter | 0.025 in. |
| Average weld current | 80 Amperes |
| Weld speed at joint | 0.125 in/sec |
| Shielding gas | Argon |
| Post weld heat-treatment (immediately after weld) | 1000° F. for 2 h in air or inert gas then furnace cool |

The Postweld Heat Treatment (PWHT) is necessary to temper the hardened regions of the Heat Affected Zone (HAZ) adjacent to the weld located in the Rex20 bearing shaft 16. Without the PWHT, an underbead crack will form in the HAZ region of bearing shaft 16.

For the weld joint fabricated in this invention, a 0.025 in. diameter wire ring supplied sufficient nickel content to inhibit crack formation in a circumferential weld with a diameter of about 0.75 in. A wire with a larger cross-sectional diameter will obviously increase the nickel content in the weld, and further enhance the ductility of the resultant weld joint.

Figure 4:
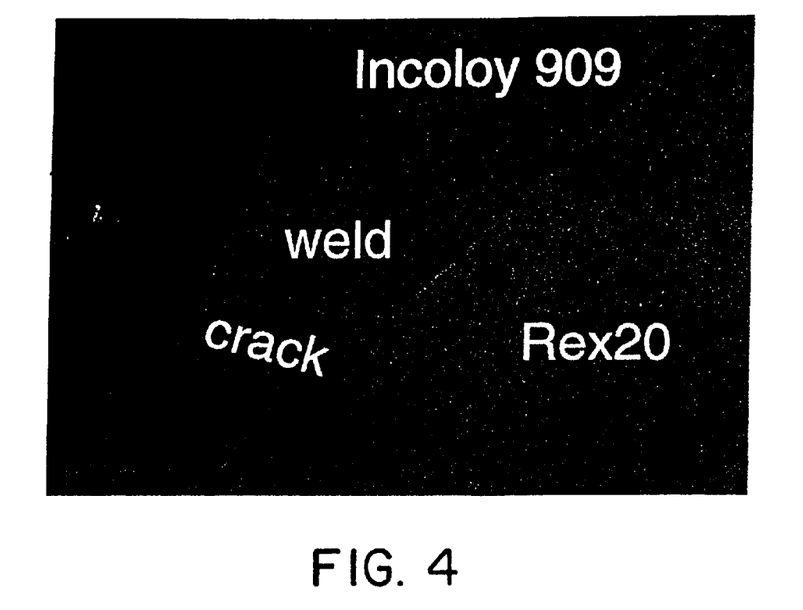
FIG. 4 is an optical micrograph taken at 20× magnification of the cross-sectional view of a weld joint with cracks present, which was fabricated without the nickel fill wire of the present invention.
Figure 5:
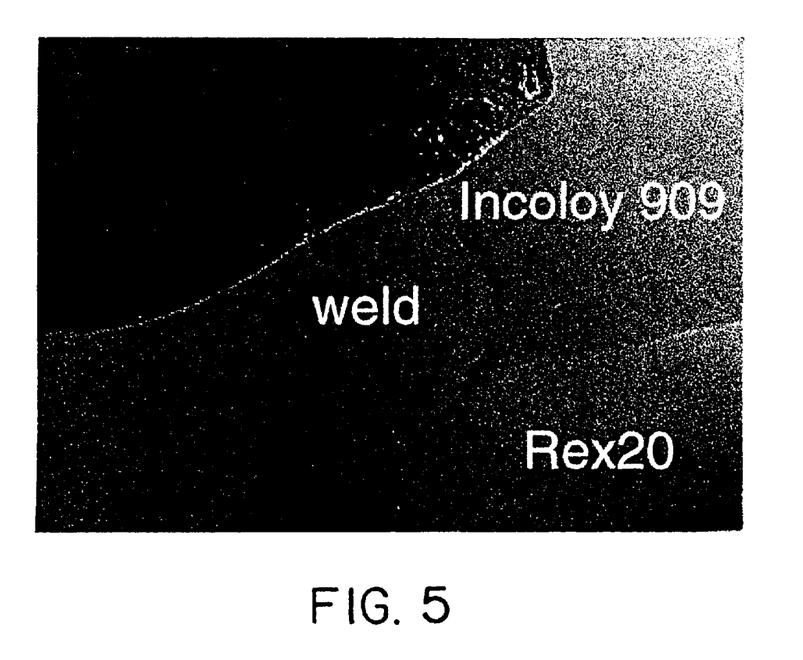
FIG. 5 is an optical micrograph taken at 20× magnification of the cross-sectional view of a weld joint without cracks, which was fabricated with the nickel fill wire of the present invention.

Metallographic cross-sections of the welds were made with and without the nickel fill wire 52, and are shown in FIGS. 4 and 5. The cross-sections shown in both FIGS. 4 and 5 are shown schematically in FIG. 2, weld joint 20. As is evident in FIG. 4, cracks are present in the weld, which was constructed without the nickel fill wire 52. The crack shown in FIG. 4 runs completely along the circumference of the weldbead. Conversely, the weld constructed with the nickel fill wire 52, as shown in FIG. 5, was free of any type of cracks, resulting in a stronger, ductile joint.

The results of an elemental analysis (in wt. %) performed on the welds both with and without a nickel fill wire 52 are shown below in Table 1. The analysis also includes the ratios of selected elemental pairs. To replicate the analysis, one needs to evaluate the same select group of elements. The results shown are averages of Energy Dispersive X-ray Spectrometry (EDS) scans taken longitudinally and laterally across a polished cross-section of each weld. The light element, carbon, could not be detected by the measurement system used in this analysis. Carbon is present, however, in the weld since CPM REX 20 contains about 1.3% carbon by weight. For calibration purposes, EDS measurements of both the CPM REX 20 and CTX-909 superalloy materials were taken, and compared to the manufacturers' nominal values (shown in square brackets). The EDS measurements for both superalloy materials compared favorably with the manufacturers' values. The results of the calibration analysis are also included in the Table 1.

TABLE 1

| | CTX-909/ CPM Rex 20 weld + nickel fill wire | CTX-909/ CPM Rex 20 weld | CPM Rex 20 [literature values] | CTX-909 [literature values] |
|---|---|---|---|---|
| Iron (Fe) | 50.7 | 59.6 | 73.1 [75] | 41.4 [40] |
| Nickel (Ni) | 24.7 | 15.8 | NA | 36.2 [38] |
| Cobalt (Co) | 7.0 | 6.2 | NA | 15.1 [14] |
| Chromium (Cr) | 1.9 | 2.1 | 3.7 [3.8] | NA |
| Molybdenum (Mo) | 4.8 | 6.0 | 11.8 [10.5] | NA |
| Tungsten (W) | 3.7 | 4.6 | 8.4 [6.3] | NA |
| Niobium (Nb) | 4.9 | 3.2 | NA | 5.4 [4.9] |
| Titanium (Ti) | 1.0 | 1.0 | NA | 1.6 [1.6] |
| Vanadium (V) | 1.0 | 1.5 | 2.2 [2.0] | NA |
| Carbon (C) | NM | NM | NM [1.3] | NM [0.06] |
| Fe/Ni | 2.0 | 3.8 | NA | 1.1 [1.0] |
| Fe/Co | 7.2 | 9.6 | NA | 2.7 [2.8] |
| Fe/Cr | 26.7 | 28.4 | 19.7 [19.7] | NA |
| Fe/Mo | 10.6 | 9.9 | 6.2 [7.1] | NA |
| Fe/W | 13.7 | 12.9 | 8.7 [11.9] | NA |
| Fe/Nb | 10.3 | 18.6 | NA | 7.7 [8.2] |

NM = not measured,
NA = not applicable

The elemental analysis conducted here using Energy Dispersive X-ray Spectrometry (EDS) shows that the nickel content in the weld increases by approximately 10% by weight, which indicates that the nickel fill wire 52 enriches the weld metal with nickel. Conversely, the iron content decreases by a similar amount. Pure nickel is ductile, non-hardenable, and has considerable solubility for most of the elements shown in Table 1. Also, nickel is not a carbide former, and exhibits a low solubility for carbon.

A weld composition rich in nickel will be ductile, and not crack upon cooling. Hence, to fabricate a crack free weld, it is necessary to add a sufficient quantity of nickel to the weld to obtain an iron-to-nickel ratio (Fe/Ni) of approximately two (2) or less for systems that have a combined weight % of iron and nickel (Fe+Ni) equal to or greater than 75%. Experimental analysis of welds with nickel additions between approximately 15 wt. % (no nickel fill wire 52) and approximately 24 wt. % exhibit, with increasing nickel additions, crack configurations ranging from complete circumferential centerline cracks (see FIG. 4) to localized cracks at the weld termination (i.e. termination cracks, tail cracks). Consistently, crack free welds were obtained with nickel additions greater than approximately 24.7 wt. % (i.e. 25 wt. %). Experimentation with various nickel wire diameters to obtain the desired 25 wt. % of elemental nickel in the weld metal is necessary for welds that are significantly larger or smaller than the joint described here.

FIG. 3 is a sectional perspective view with the weld joint 20 exploded to reveal one type of construction of weld joint 20, and the incorporation of nickel fill wire 52 into the weld. The positioning of the nickel fill wire 52 insures that it is exposed to the hot plasma flame of the torch, becomes completely liquid, and alloys thoroughly with the molten phases of the hub 18 and the bearing shaft 16 being joined together.

Analytical methods such as Energy Dispersive X-ray Spectroscopy (EDS) and Inductively Coupled Plasma/Atomic Emission Spectroscopy (ICP/AES) can be used to determine the presence of the nickel addition in the weld metal. Both methods of analysis will measure higher nickel contents in welds that utilize this invention when compared to geometrically identical welds that are fabricated without it. For ICP/AES analysis, a small section of the weld metal must be cut from the joint and analyzed. For an accurate ICP/AES analysis, it is imperative that the weld metal, free of the base metal components, be analyzed.

It will be obvious to those skilled in the art that various modifications and variations of the present invention are possible without departing from the scope of the invention, which provides a method for fabricating a bearing shaft assembly possessing unique thermo-physical properties ideally suited for use in a rotating anode X-ray tube. For example, the present invention is not limited to the use of CTX-909, but may include other low expansivity, iron-based superalloy materials such as Incoloy Alloy 903, Alloy 907 and Alloy 909. Further, tool steels with chemical compositions similar to CPM REX 20 that contain high weight fractions of carbon (>1%) and total refractory metal additions greater than 15% are likely candidates in the present invention. Tool steel equivalents include CPM REX 25, which is also manufactured by Crucible Materials Corporation.

What is claimed is:

1. A crack resistant, ductile weld formed by the method comprising the steps of:
   a. incorporating commercially pure nickel into a joint formed between at least two dissimilar metallic alloys, wherein at least one of the metallic alloys is a high carbon, powder metallurgical, cobalt free tool steel that contains greater than 1 wt. % of carbon and total refractory metal additions greater than 15 wt. %; and thereafter
   b. welding the nickel filled joint.

2. The crack resistant, ductile weld in accordance with claim 1, wherein at least one of the metallic alloys is an iron-based, low expansivity, gamma-prime strengthened superalloy.

3. The crack resistant, ductile weld in accordance with claim 2, wherein the iron-based, low expansivity, gamma-prime strengthened superalloy is selected from the group consisting of CTX-909, Incoloy Alloy 903, Incoloy Alloy 907, and Incoloy Alloy 909.

4. The crack resistant, ductile weld in accordance with claim 2, wherein the joint after welding comprises a sufficient quantity of the nickel to obtain an iron-to-nickel ratio (Fe/Ni) of approximately 2 or less for systems that have a combined weight % of iron and nickel equal to or greater than 75% as determined by EDS analysis.

5. The crack resistant, ductile weld in accordance with claim 1, wherein the high carbon, powder metallurgical, cobalt free, tool steel is selected from the group consisting of CPM REX 20, REX 25, REX M2HCHS, REX M3HCHS, REXM4, REX M4HS, HAP1O, ASP23, and KHA33N.

6. The crack resistant, ductile weld in accordance with claim 1, wherein the nickel filled joint is Tungsten Inert Gas welded at about 80 Amperes (average current) and a weld speed of about 0.125 in/sec.

7. The crack resistant, ductile weld in accordance with claim 1, wherein the nickel is incorporated as a formed wire.

8. The crack resistant, ductile weld in accordance with claim 1, wherein the nickel is incorporated as a preformed washer.

9. The crack resistant, ductile weld in accordance with claim 1, wherein the nickel is commercially pure nickel that is 99.00% minimum by weight.

10. The crack resistant, ductile weld in accordance with claim 1, wherein the amount of the nickel in the joint after welding is approximately 25 wt. % as determined by EDS analysis.

11. A crack resistant, ductile weld, comprising a joint formed between at least two dissimilar, metallic alloys with commercially pure nickel incorporated into the joint, said nickel filled joint being welded to produce a stable weld without cracks, wherein at least one of the metallic alloys is a high carbon, powder metallurgical, cobalt free tool steel that contains greater than 1 wt. % of carbon and total refractory metal additions greater than 15 wt. %.

12. The crack resistant, ductile weld in accordance with claim 11, wherein at least one of the metallic alloys is an iron-based, low expansivity, gamma-prime strengthened superalloy.

13. The crack resistant, ductile weld in accordance with claim 12, wherein the iron-based, low expansivity, gamma-prime strengthened superalloy is selected from the group consisting of CTX-909, Incoloy Alloy 903, Incoloy Alloy 907, and Incoloy Alloy 909.

14. The crack resistant, ductile weld in accordance with claim 12, wherein the joint after welding comprises a sufficient quantity of nickel to obtain an iron-to-nickel ratio (Fe/Ni) of approximately 2 or less for systems that have a combined weight % of iron and nickel equal to or greater than 75% as determined by EDS analysis.

15. The crack resistant, ductile weld in accordance with claim 11, wherein the high carbon, powder metallurgical, cobalt free tool steel is selected from the group consisting of CPM REX 20, REX 25, REX M2HCHS, REX M3HCHS, REXM4, REX M4HS, HAP1O, ASP23, and KHA33N.

16. The crack resistant, ductile weld in accordance with claim 11, wherein the nickel is a preformed washer.

17. The crack resistant, ductile weld in accordance with claim 11, wherein the nickel is a preformed washer.

18. The crack resistant, ductile weld in accordance with claim 11, wherein the nickel is commercially pure nickel that is 99.00% minimum by weight.

19. The crack resistant, ductile weld in accordance with claim 11, wherein the amount of nickel in the joint after welding is approximately 25 wt. % as determined by EDS analysis.

20. A crack resistant, ductile weld formed by the method comprising the steps of:
   a. incorporating commercially pure nickel into a joint formed between at least two dissimilar metallic alloys, at least one of the metallic alloys being an iron-based, low expansivity, gamma-prime strengthened superalloy, and at least one of the metallic alloys being a high carbon, powder metallurgical, cobalt free tool steel that contains greater than 1 wt. % of carbon and total refractory metal additions greater than 15 wt. %; and thereafter
   b. welding the nickel filled joint.

21. The crack resistant, ductile weld in accordance with claim 20, wherein the iron-based, low expansivity, gamma-prime strengthened superalloy is selected from the group consisting of CTX-909, Incoloy Alloy 903, Incoloy Alloy 907, and Incoloy Alloy 909.

22. The crack resistant, ductile weld in accordance with claim 20, wherein the high carbon, powder metallurgical, cobalt free, tool steel is selected from the group consisting of CPM REX 20 , REX 25, REX M2HCHS, REX M3HCHS, REXM4, REX M4HS, HAP1O, ASP23, and KHA33N.

23. The crack resistant, ductile weld in accordance with claim 20, wherein the nickel filled joint is Tungsten Inert Gas welded at about 80 Amperes (average current) and a weld speed of about 0.125 in/sec.

24. The crack resistant, ductile weld in accordance with claim 20, wherein the nickel is incorporated as a formed wire.

25. The crack resistant, ductile weld in accordance with claim 20, wherein the nickel is incorporated as a preformed washer.

26. The crack resistant, ductile weld in accordance with claim 20, wherein the nickel is commercially pure nickel that is 99.00% minimum by weight.

27. The crack resistant, ductile weld in accordance with claim 20, wherein a sufficient quantity of the nickel is added to obtain an iron-to-nickel ratio (Fe/Ni) of approximately 2 or less for systems that have a combined weight % of iron and nickel equal to or greater than 75% as determined by EDS analysis.

28. The crack resistant, ductile weld in accordance with claim 20, wherein the amount of the nickel in the joint after welding is approximately 25 wt. % as determined by EDS analysis.

29. A crack resistant, ductile weld, comprising a joint formed between at least two dissimilar, metallic alloys, at least one of the metallic alloys being an iron-based, low expansivity, gamma-prime strengthened superalloy, and at least one of the metallic alloys being a high carbon, powder metallurgical, cobalt free tool steel that contains greater than 1 wt. % of carbon and total refractory metal additions greater than 15 wt. %, with commercially pure nickel incorporated into the joint, said nickel filled joint being welded to produce a stable weld without cracks.

30. The crack resistant, ductile weld in accordance with claim 29, wherein the iron-based, low expansivity, gamma-prime strenghtened superalloy is selected from the group consisting of CTX-909, Incoloy Alloy 903, Incoloy Alloy 907, and Incoloy Alloy 909.

31. The crack resistant, ductile weld in accordance with claim 29, wherein the high carbon, powder metallurgical, cobalt free tool steel is selected from the group consisting of CPM REX 20, REX 25, REX M2HCHS, REX M3HCHS, REXM4, REX M4HS, HAP1O, ASP23, and KHA33N.

32. The crack resistant, ductile weld in accordance with claim 29, wherein the nickel is a formed wire.

33. The crack resistant, ductile weld in accordance with claim 29, wherein the nickel is a preformed washer.

34. The crack resistant, ductile weld in accordance with claim 29, wherein the nickel is commercially pure nickel that is 99.00% minimum by weight.

35. The crack resistant, ductile weld in accordance with claim 29, wherein a sufficient quantity of nickel is present to obtain an iron-to-nickel ratio (Fe/Ni) of approximately 2 or less for systems that have a combined weight % of iron and nickel equal to or greater than 75% as determined by EDS analysis.

36. The crack resistant, ductile weld in accordance with claim 29, wherein the amount of the nickel in the joint after welding is approximately 25 wt. % as determined by EDS analysis.

* * * * *